US012608581B2

(12) United States Patent
Tripp et al.

(10) Patent No.: US 12,608,581 B2
(45) Date of Patent: Apr. 21, 2026

(54) WRISTBANDS HAVING RFID CIRCUITS WITH NON-OVERLAPPING ANTENNA

(71) Applicant: Zebra Technologies Corporation, Lincolnshire, IL (US)

(72) Inventors: Chad E. Tripp, Jacksonville, FL (US); Steven J. Vandercar, Rolling Meadows, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/806,487

(22) Filed: Aug. 15, 2024

(65) Prior Publication Data

US 2026/0050760 A1      Feb. 19, 2026

(51) Int. Cl.
*G06K 19/077* (2006.01)

(52) U.S. Cl.
CPC . *G06K 19/07792* (2013.01); *G06K 19/07786* (2013.01)

(58) Field of Classification Search
CPC .......... G06K 7/10366; G06K 7/10376; G06K 7/10396; G06K 19/07762; H01Q 1/273
See application file for complete search history.

(56) References Cited

U.S. PATENT DOCUMENTS

| | | | | |
|---|---|---|---|---|
| 8,073,548 | B2 * | 12/2011 | Colvin, Jr. ............... | H01Q 1/44 |
| | | | | 607/30 |
| 10,733,495 | B2 * | 8/2020 | Ennis .................. | G06K 19/0776 |
| 11,797,819 | B2 * | 10/2023 | Bourque ................ | G09F 3/005 |
| 12,033,023 | B1 * | 7/2024 | Fisher, II ........... | G06K 19/0727 |
| 12,175,319 | B1 * | 12/2024 | Vandercar ........ | G06K 19/07762 |
| 2003/0173408 | A1 * | 9/2003 | Mosher, Jr. ............ | A61B 90/90 |
| | | | | 235/492 |
| 2014/0266624 | A1 * | 9/2014 | Van Bosch ........ | G06K 7/10544 |
| | | | | 235/492 |
| 2015/0041547 | A1 * | 2/2015 | Sofoulis ............. | G06K 7/10009 |
| | | | | 235/492 |
| 2016/0259952 | A1 * | 9/2016 | Van Rens .......... | G06K 7/10366 |

\* cited by examiner

*Primary Examiner* — Thien M Le
*Assistant Examiner* — April A Taylor

(57) ABSTRACT

A wristband has a flexible elongated body with an open state in which the wristband is capable of being positioned in a planar configuration and a closed state in which the wristband is wrapped in a loop. An RFID circuit is supported by the body and is positioned on the body such that the RFID circuit is configured to be included in the loop when the wristband is in the closed state. An elongated conductive element is supported by the body and is positioned on the body such that the elongated conductive element is configured to be included in the loop when the wristband is in the closed state. The elongated conductive element is spaced away from the RFID circuit and extends circumferentially about the loop in the closed state.

19 Claims, 13 Drawing Sheets

800

100

Reader        810

1100

1102

Obtain a substrate of a wristband.

1104

Support an RFID inlay on a body of the substrate such that the RFID inlay is included in the loop when the wristband is in the closed state and the antennas or antenna segments extend circumferential about the loop in a bypassing, non-overlapping arrangement.

WRISTBANDS HAVING RFID CIRCUITS WITH NON-OVERLAPPING ANTENNA

BACKGROUND

Wristbands that include radiofrequency identification device (RFID) inlays typically suffer from readability issues due to interference from the body of the wearer of the wristband. The impact of the readability issues can vary based on a position of the RFID inlays relative to the body of the wearer and the RFID reader and can be particularly exasperated when the wrist of the wearer is positioned between the RFID inlay and the RFID reader.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
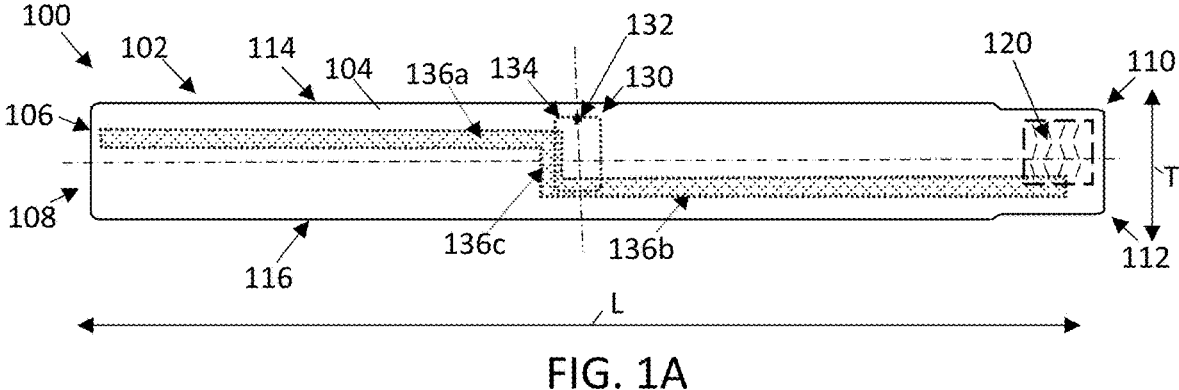
FIG. 1A is a schematic view of an example of a wristband in accordance with embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The components of embodiments of the present disclosure have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Embodiments of the present disclosure are related to systems and/or devices that include a wristband with a radiofrequency identification device (RFID) circuit and provide for enhanced readability of the RFID circuit via at least bypassing, non-overlapping opposing terminal ends of antenna(s) when the wristband is in a closed state (e.g., wrapped around a wrist of a wearer). The wristband can advantageously increase a read range of the RFID circuit, can increase the read angle of the RFID circuit, and can aid in overcoming the effect and/or impact of radiofrequency interference caused by a body of the wearer of the wristband. The antenna extends circumferentially around the wristband when the wristband is wrapped around the wrist, ankle, or other body part of the wearer such that at least the opposing terminal ends of the antenna have a bypassing, non-overlapping arrangement. With this arrangement, even when portions of the RFID circuit are obstructed by the wrist or other body part, the readability of the RFID circuit can be improved and/or can be independent of the orientation of the RFID circuit in the wristband.

The bypassing, non-overlapping antenna arrangement of embodiments of the wristbands of the present disclosure can provide a "universal" wristband that allow wearers having different wrist diameters to use the same sized wristband while avoiding issues that occur when parts of the RFID circuit overlap each other (e.g., when the antenna overlaps itself). For example, a single wristband size can be worn by children and adults and while the wristband may be wrapped about itself on the wrist of the wearer in an overlapping manner where the amount of overlap is inversely proportional to the diameter of the wrist of the wearers (e.g., the wristband can wrapped about itself on a child's wrist resulting in a significant overlap or the wristband can wrapped about itself on an adult's wrist resulting in a small amount of overlap compared to the child), the antenna arrangement can allow the antenna to wrapped about the wrist of the wearer in a bypassing, non-overlapping manner.

In accordance with embodiments of the present disclosure, a device is disclosed. The device includes a wristband having a flexible elongated body and an RFID circuit. The wristband has an open state in which the wristband is capable of being positioned in a planar configuration and has a closed state in which the wristband is wrapped in a loop such that a first end of the wristband overlaps a second end of the wristband and is fixed to the body. The RFID circuit is supported by the elongated body of the wristband and is positioned on the body such that the RFID circuit is configured to be included in the loop when the wristband is in the closed state. The RFID circuit includes an antenna configured to be included in the loop when the wristband is in the closed state. The antenna extends circumferentially in a bypassing, non-overlapping arrangement about the loop in the closed state.

In accordance with embodiments of the present disclosure, the RFID circuit is disposed between a first substrate and a second substrate.

In accordance with embodiments of the present disclosure, the RFID circuit includes an electronic circuit, an inductive loop operatively coupled to the electronic circuit, and the antenna operatively coupled to the inductive loop. A portion of the antenna overlays the inductive loop and coincides with a perimeter of the inductive loop.

In accordance with embodiments of the present disclosure, the antenna includes a first segment extending between a proximal end of the wristband and the inductive loop and includes a second segment extending between a distal end of the wristband and the inductive loop.

In accordance with embodiments of the present disclosure, the first segment and the second segment extend parallel to each other.

In accordance with embodiments of the present disclosure, the elongated body has a length measured along a longitudinal axis and a width measure along a transverse axis that is perpendicular to the longitudinal axis, and the first segment and the second segment are offset relative to each other along at least one of the longitudinal axis or the transverse axis.

In accordance with embodiments of the present disclosure, the first and second segments extend parallel to the longitudinal axis.

In accordance with embodiments of the present disclosure, at least one of the first segment or the second segment has a helix angle of ninety degrees.

In accordance with embodiments of the present disclosure, at least one of the first segment or the second segment has a nonzero helix angle that is less than ninety degrees.

In accordance with embodiments of the present disclosure, the first segment bypasses the second segment without overlapping the second segment when the wristband is in the closed state.

In accordance with embodiments of the present disclosure, at least one of the first segment of the second segment extends along the longitudinal axis between thirty and sixty percent of the length of the wristband.

In accordance with embodiments of the present disclosure, the antenna includes a third segment extending between the first and second segments.

In accordance with embodiments of the present disclosure, a length of the second segment is equal to or greater than a length of the first segment.

In accordance with embodiments of the present disclosure, the inductive loop electrically couples the first segment to the second segment.

In accordance with embodiments of the present disclosure, the first segment is disposed entirely on a first side of a centerline of the wristband and the second segment is disposed entirely on the second side of the centerline.

In accordance with embodiments of the present disclosure, at least one of the first segment or the second segment has a serpentine pattern.

In accordance with embodiments of the present disclosure, the elongated body has a length measured along a longitudinal axis and a width measure along a transverse axis that is perpendicular to the longitudinal axis, and the antenna extends along the longitudinal axis between fifty percent and one hundred percent of the length of the wristband.

In accordance with embodiments of the present disclosure, the elongated body has a length measured along a longitudinal axis and a width measure along a transverse axis that is perpendicular to the longitudinal axis, and the antenna extends along the longitudinal axis between seventy percent and one hundred percent of the length of the wristband.

In accordance with embodiments of the present disclosure, the elongated body has a length measured along a longitudinal axis and a width measure along a transverse axis that is perpendicular to the longitudinal axis, and the antenna extends linearly between the proximal and distal end of the wristband and has a nonzero helix angle that is less than relative to the transverse axis.

In accordance with embodiments of the present disclosure, the antenna extends circumferentially about the loop by approximately one hundred eighty (180) degrees to approximately three hundred sixty (360) degrees.

In accordance with embodiments of the present disclosure, the antenna is a dipole antenna.

In accordance with embodiments of the present disclosure, a method is disclosed. The method includes obtaining a substrate of a wristband. The wristband has an open state in which the substrate is capable of being positioned in a planar configuration and has a closed state in which the substrate is wrapped in a loop such that a first end of the substrate overlaps a second end of the substrate. The method also includes supporting an RFID circuit on the substrate of the wristband. The RFID circuit is positioned on the body and includes an antenna configured to be included in the loop when the wristband is in the closed state. The antenna extends circumferentially in a bypassing, non-overlapping arrangement about the loop in the closed state.

In accordance with embodiments of the present disclosure, the method includes supporting, on the substrate, an electronic circuit, an inductive loop, and the antenna of the RFID circuit on the substrate, the inductive loop operatively coupled to the electronic circuit and the antenna operatively coupled to the inductive loop. A portion of the antenna that overlays the inductive loop and coincides with a perimeter of the inductive loop.

In accordance with embodiments of the present disclosure, the method includes defining the antenna to include a first segment extending between a proximal end of the wristband and the inductive loop and a second segment extending between a distal end of the wristband and the inductive loop.

In accordance with embodiments of the present disclosure, the first segment and the second segment extend parallel to each other.

In accordance with embodiments of the present disclosure, the elongated body has a length measured along a longitudinal axis and a width measure along a transverse axis that is perpendicular to the longitudinal axis, and the method includes offsetting the first segment from the second segment relative to each other along at least one of the longitudinal axis or the transverse axis.

In accordance with embodiments of the present disclosure, the first and second segments extend parallel to the longitudinal axis.

In accordance with embodiments of the present disclosure, at least one of the first segment or the second segment has a helix angle of ninety degrees.

In accordance with embodiments of the present disclosure, at least one of the first segment or the second segment has a nonzero helix angle that is less than ninety degrees.

In accordance with embodiments of the present disclosure, the method includes bypassing the second segment with the first segment without overlapping the second segment when the wristband is in the closed state.

In accordance with embodiments of the present disclosure, at least one of the first segment of the second segment extends along the longitudinal axis between thirty and sixty percent of the length of the wristband.

In accordance with embodiments of the present disclosure, the antenna includes a third segment extending between the first and second segments.

In accordance with embodiments of the present disclosure, a length of the second segment is greater than a length of the first segment.

In accordance with embodiments of the present disclosure, the method includes electrically coupling the first segment to the second segment via the inductive loop.

In accordance with embodiments of the present disclosure, the method includes disposing the first segment entirely on a first side of a centerline of the wristband and disposing the second segment entirely on the second side of the centerline.

In accordance with embodiments of the present disclosure, at least one of the first segment or the second segment has a serpentine pattern.

In accordance with embodiments of the present disclosure, the elongated body has a length measured along a longitudinal axis and a width measure along a transverse axis that is perpendicular to the longitudinal axis, and the antenna extends along the longitudinal axis between fifty percent and one hundred percent of the length of the wristband.

In accordance with embodiments of the present disclosure, the elongated body has a length measured along a longitudinal axis and a width measure along a transverse axis that is perpendicular to the longitudinal axis, and the antenna extends along the longitudinal axis between seventy percent and one hundred percent of the length of the wristband.

In accordance with embodiments of the present disclosure, the elongated body has a length measured along a longitudinal axis and a width measure along a transverse axis that is perpendicular to the longitudinal axis, and the antenna extends linearly between the proximal and distal end of the wristband and has a nonzero helix angle that is less than relative to the transverse axis.

In accordance with embodiments of the present disclosure, the antenna extends circumferentially about the loop by approximately one hundred eighty (180) degrees to approximately three hundred sixty (360) degrees.

In accordance with embodiments of the present disclosure, the antenna is a dipole antenna.

Figure 1B:
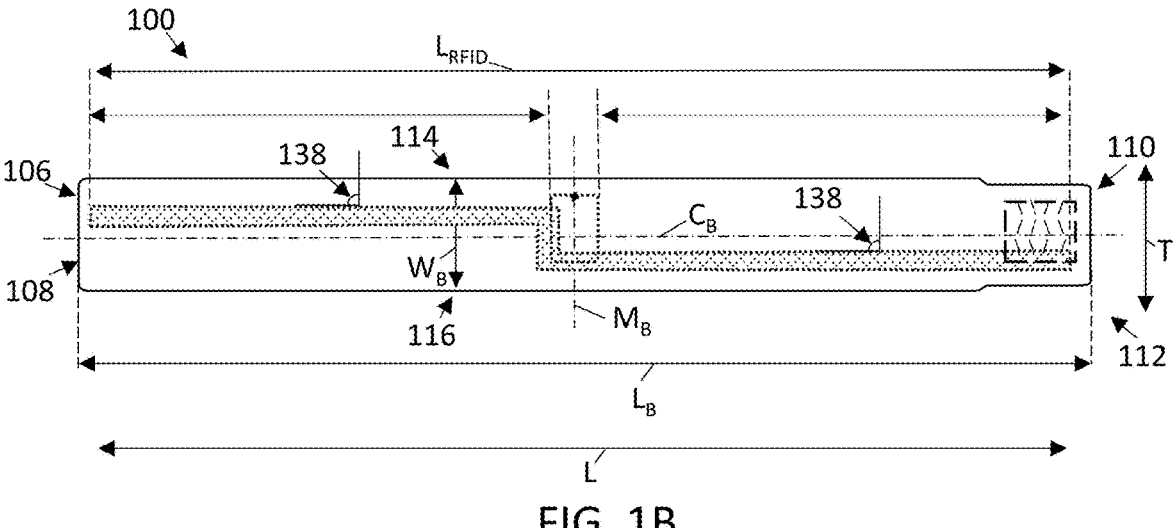
FIG. 1B is a schematic view of an example of a wristband in accordance with embodiments of the present disclosure.
Figure 1C:
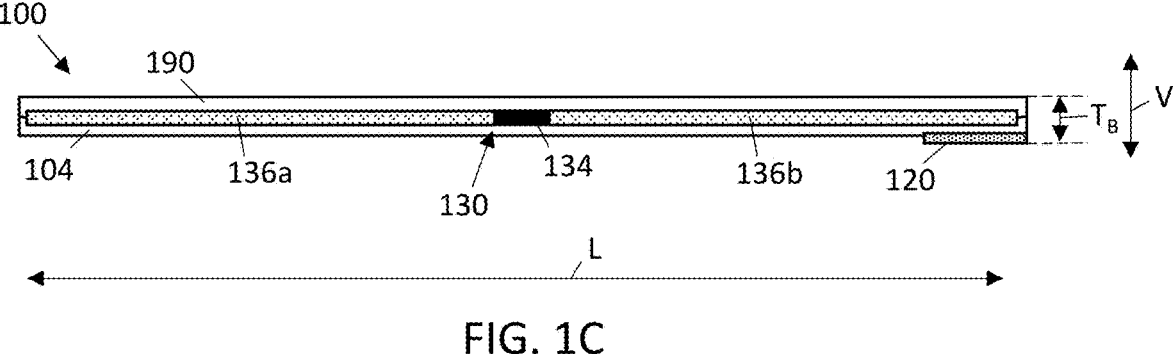
FIG. 1C is a schematic profile view of an example of a wristband in accordance with embodiments of the present disclosure.
Figure 9:
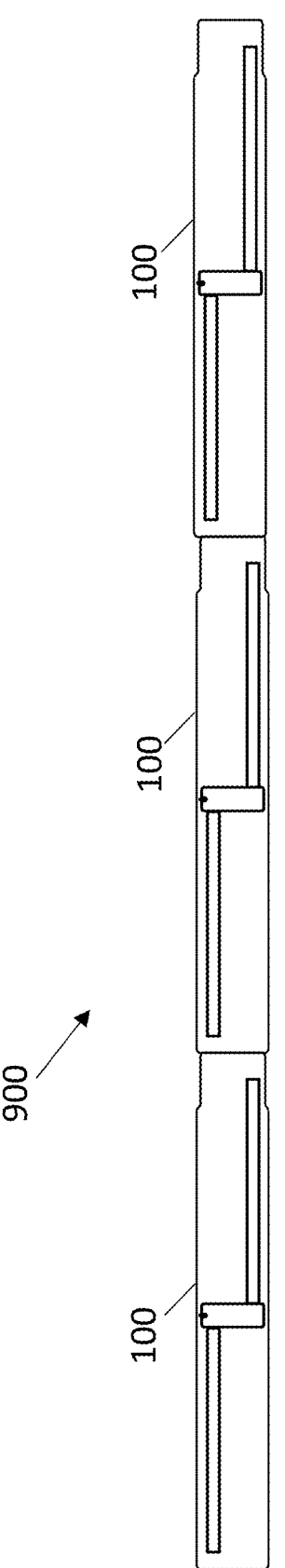
FIG. 9 illustrates an example web of wristbands in accordance with embodiments of the present disclosure.
Figure 10:
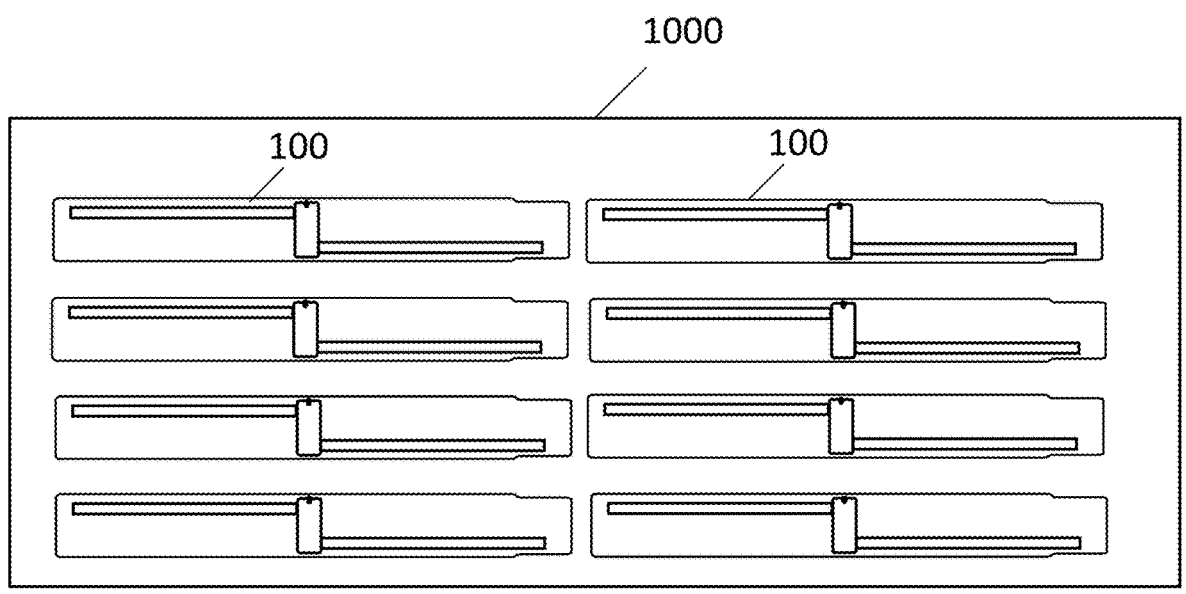
FIG. 10 illustrates an example sheet of wristbands in accordance with embodiments of the present disclosure.

FIGS. 1A-C illustrate an example embodiment of a wristband or band 100 in an open position in accordance with embodiments of the present disclosure. FIGS. 1A-B are schematic plan views of the example wristband 100 and FIG. 1C is a schematic profile view of the example wristband 100. The wristband 100 can have an elongated body 102, shown in FIGS. 1A-C in an open state in which the wristband 100 is capable of being positioned in a planar configuration. The body 102 can be formed from a flexible and/or non-rigid substrate 104. As an example, the substrate 104 can be formed from one or more of paper, elastomers, polymers, and/or any combination thereof. Polymers used to form the substrate 104 can include, for example, polyesters, thermoplastic and/or vinyl polymers, such as polypropylene, polyethylene, polyethylene terephthalate, nylon, and/or Tyvek®, other materials, and/or any combination thereof. The substrate 104 or at least a portion thereof provides a printable surface upon which indica can be printed, e.g., via thermal printing by a thermal printer. The wristband 100 can be provided individually and/or multiple wristbands 100 can be stored in a web 900 of wristbands where the wristbands are aligned end-to-end, as shown in FIG. 9, and/or can be stored in a sheet 1000 of wristbands 100 where the wristbands 100 are distributed on the sheet, as shown in FIG. 10. To print on the substrates 104 of the wristbands 100, the web 900 and/or sheet 1000 can be fed through a printer.

The wristband 100 can be wrapped about an arm or wrist of a wearer (e.g., a human wearing the wristband). While the wristband 100 can be wrapped about the arm or wrist of the wearer, the wristband 100 can be also be wrapped about other parts of the human body, such as a leg or an ankle, can be wrapped about parts of animal's bodies, such as legs, neck, and/or other parts of the body, and/or can be wrapped about inanimate objects.

Figure 3A:
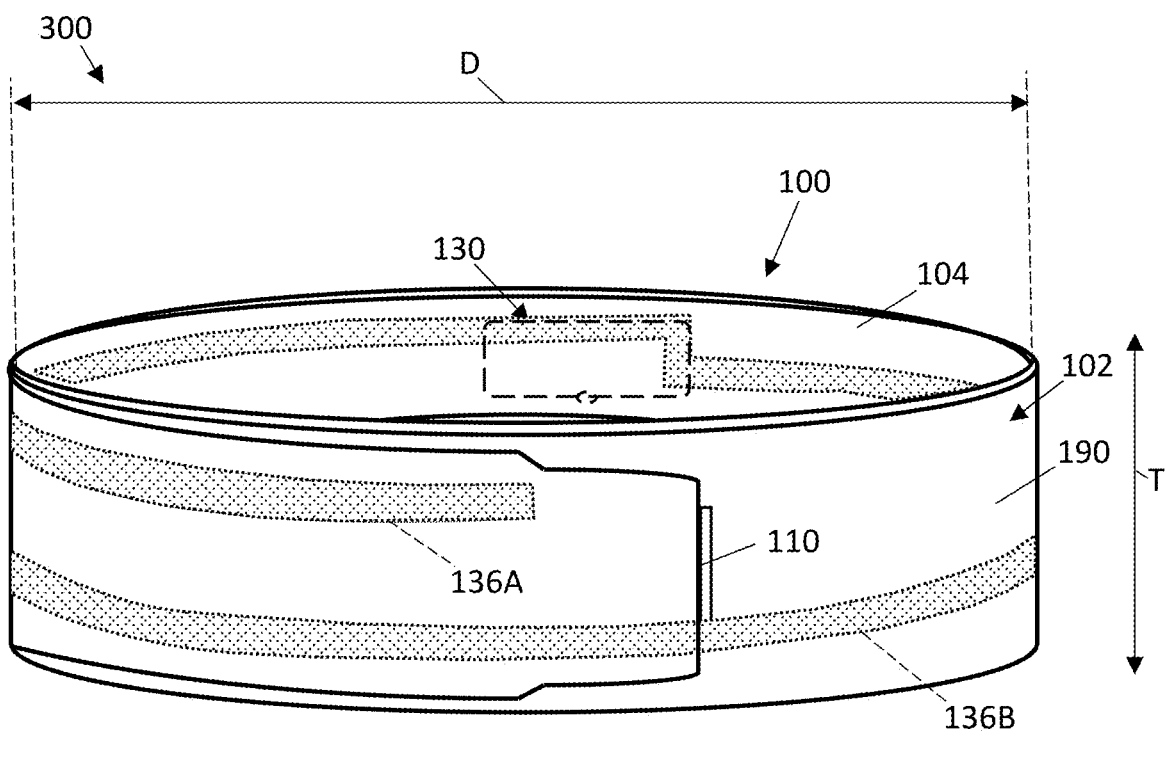
FIG. 3A-B illustrates an embodiment of an example wristband in a closed state in which the wristband is wrapped in a loop in accordance with embodiments of the present disclosure.
Figure 3B:
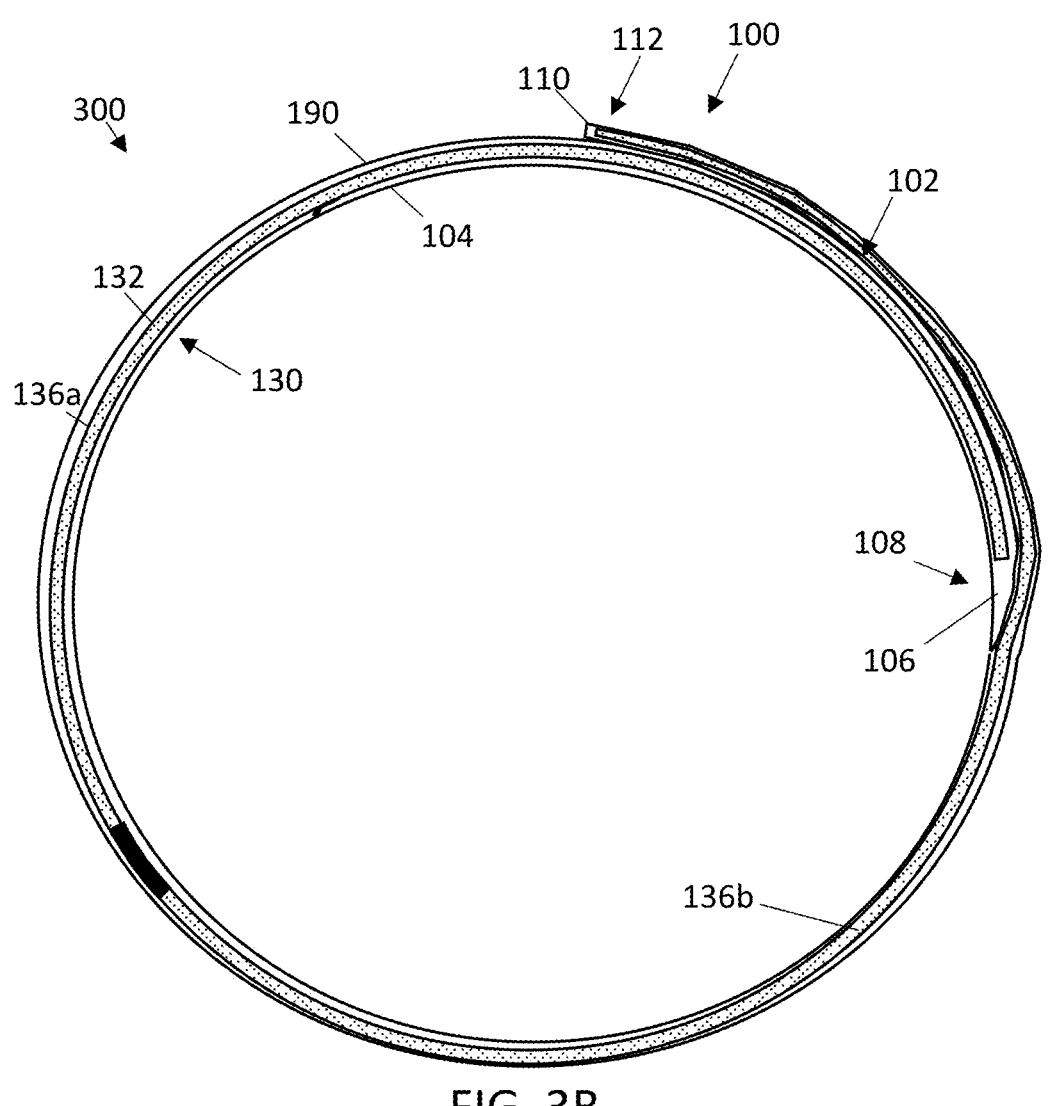
Figure 3C:
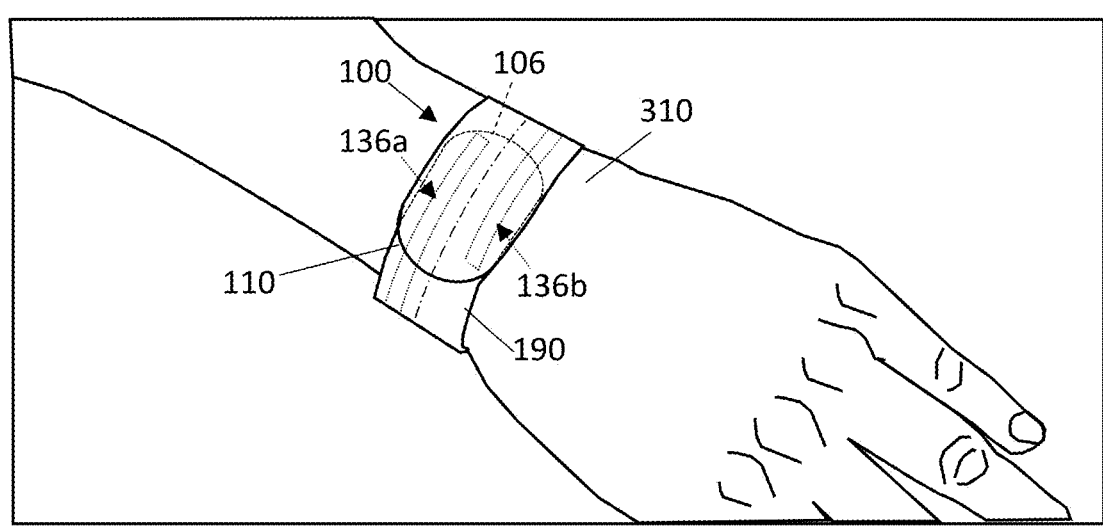
FIG. 3C illustrates an embodiment of an example wristband in a closed state in which the wristband is wrapped in a loop about a wrist of a wearer in accordance with embodiments of the present disclosure.

The body 102 can have a length $L_B$ measured along a longitudinal axis L from a terminal end 106 at a proximal end 108 of the body 102 to a terminal end 110 at a distal end 112 and can have midline $M_B$ that is halfway between the terminal ends 106 and 110. As used herein, proximal ends generally refer to ends of components on the left side relative to each other in the orientation illustrated in FIGS. 1A-C and distal ends generally refer to ends of components on the right side relative to each other in the orientation illustrated in FIGS. 1A-C. The length $L_B$ of the body 102 can be, for example, approximately four (4) inches to approximately twenty (20) inches. As shown in FIGS. 1A-C, the wristband 100 can have a first (open) state in which the wristband 100 can be positioned in a planar configuration where the terminal ends 106 and 110 can be free. As shown in FIGS. 3A-C, the wristband 100 can have a second (closed) state in which the wristband is fixed in loop 300 (e.g., where the wristband 100 is looped around itself and at least one of the terminal ends 106 or 110 is fixed, fastened, or otherwise secured to the body 102) to wrap the wristband 100 about a wearer of the wristband 100. The body 102 can have a width $W_B$ measured along a transverse axis T at the proximate end 108 of the body 102 from an edge 114 to an edge 116 of the body 102 and a centerline $C_B$ that is halfway between the edges 114 and 116. In one example, the width $W_B$ can be between one quarter (0.25) of an inch to three (3) inches or between one (1) inch and two (2) inches. A thickness $T_B$ of the wristband 100 can be measured along a vertical axis V. The transverse axis T, the longitudinal axis L, and the vertical axis V are each perpendicular to each other. In one example, the body 102 can have a generally rectangular perimeter with a uniform width along the longitudinal axis L from the terminal end 106 to the terminal end 110.

While the body 102 is illustrated as having a generally rectangular perimeter, the body 102 can have differently shaped perimeters and/or the width $W_B$ can vary or be non-uniform along the longitudinal axis L from the terminal end 106 to the terminal end 110.

A radiofrequency identification device (RFID) circuit 130 can be supported by the body 102. The RFID circuit 130 includes an electronic circuit 132, an inductive loop 134, and an antenna 136 which in the present example is illustrated as a dipole antenna. The antenna 136 can be coupled to the inductive loop 134 and the inductive loop 134 can be coupled to the electronic circuit 132. While the antenna 136 is illustrated as being a dipole antenna, embodiments of the present disclosure can include different types of antennas (e.g., loop antenna, slot antenna, etc.) and/or different antenna configurations or geometries. The RFID circuit 130 can be embodied as an RFID inlay, transponder, tag, or other form factor.

As shown in FIGS. 1A-B, the antenna 136 can have antenna segments 136a-c. The antenna segment 136a can extend between the terminal end 106 and a first (proximal) side of the inductive loop 134, the antenna segment 136b can extend between a second (distal) side of the inductive loop 134 and the terminal end 110, and the antenna segment 136c can connect the antenna segments 136a and 136b. In one example, a length of the antenna segment 136b can be equal to or greater than a length of the antenna segment 136a (or vice versa). The antenna segment 136a extends along the longitudinal axis L between thirty (30) and sixty (60) percent of the length $L_B$ of the wristband 100, the antenna segment 136b extends along the longitudinal axis L between thirty (30) and sixty (60) percent of the length $L_B$ of the wristband 100, and/or the antenna 136 extends along the longitudinal axis L between fifty (50) and one hundred (100) percent of the length $L_B$ of the wristband 100. The antenna segments 136a and 136b can be offset from each other relative to the transverse axis T such that when the wristband is configured in the closed position forming a loop (e.g., loop 300 shown in FIGS. 3A-C), the portion of the antenna 136 on the proximal side of the inductive loop 134, and the portion of the antenna 136 on the distal side of the inductive loop 134 bypass and do not overlap each other (e.g., radially with respect to the loop 300). For example, when the wristband 100 is in the closed position, the antenna segments 136a and 136b bypass and do not overlap each other (e.g., radially with respect to the loop 300). As shown in FIGS. 1A-B, the antenna segments 136a and 136b can also be offset from each other along the longitudinal axis L such that the antenna segments 136a and 136b do not align along the transverse axis T. In one example, a midline of the RFID circuit 130 (e.g., halfway along the length $L_{RFID}$ of the RFID circuit 130) can be aligned with the midline $M_B$ of the wristband 100. The antenna 136 can be asymmetrically disposed about the midline $M_B$ of the wristband 100 and/or can be asymmetrically disposed about the centerline $C_B$ of the wristband 100. As shown in FIGS. 1A-B, the antenna segments 136a and 136b can extend linearly and can be parallel to each other and to the longitudinal axis L such that when the wristband 100 is the closed configuration to form a loop (e.g., loop 300 shown in FIGS. 3A-C), the antenna segments 136a and 136b can form helices having a helix angle 138 of ninety degrees relative to the transverse axis T (which extends axially when the loop 300 is formed). The antenna segment 136c can extend at angle relative to the antenna segments 136a and 136b and to the longitudinal axis L. In one example, the antenna segment 136c can extend parallel to the transverse axis T such that the antenna segment has a helix angle of zero relative to the transverse axis T when the wristband 100 is the closed configuration to form a loop (e.g., loop 300 shown in FIGS. 3A-C). In one example, the antenna segment 136c can extend at a nonzero angle relative to the longitudinal axis L and the transverse axis T (e.g., the antenna segment 136c can extend at an oblique angle relative to the longitudinal axis L and/or the transverse axis T). In one example the antenna segments 136a can extend along the longitudinal axis L on a first side of the centerline $C_B$ and antenna segment 136b can extend along the longitudinal axis L on a second side of the centerline $C_B$. In one example, the antenna segment 136a entirely disposed on the first side of the centerline $C_B$ and the antenna segment is disposed entirely on the second side of the centerline $C_B$. In one example, at least a portion of the antenna segments 136a and/or 136b can extend across the centerline $C_B$. In one example, portions of the antenna segments 136a-c proximate to the inductive loop 132 can generally conform with a shape of the inductive loop 132 (e.g., the portions of the segments 136a-c can follow a perimeter of the inductive loop to avoid creating a new inductive loop with the antenna segments).

While the antenna 136 has been illustrated as including generally linear and parallel antenna segments 136a and 136b with a non-parallel antenna segment 136c connecting the antenna segments 136a and 136b, embodiments of the present disclosure can include other antenna configurations in which the antenna segments 136a and 136b bypass each other and do not overlap when the wristband is in the closed position to form the loop. Some examples of other antenna configurations for the antenna 136 are illustrated in FIGS. 4-6. Furthermore, while the antenna segments 136a and 136b have been illustrates as linear, rectangular segments, embodiments of the antenna segment 136a and/or antenna segment 136b can have a different configuration, such as a serpentine configuration (e.g., as shown in FIG. 5B).

A length of the antenna 136 can be specified or tuned based on a wavelength of the radiofrequency communication to be received and/or transmitted by the RFID circuit 130. As an example, the length of the antenna 136 can be equal to the wavelength, a fraction of the wavelength, such as three quarters of the wavelength, one half of the wavelength, one quarter of the wavelength, one eighth of the wavelength, or other fractions of the wavelength. As an example, the length of the antennas 136 can be approximately two inches to twenty-four inches. As an example, the length of the antennas 136 can be two inches, three inches, four inches, six inches, nine inches, twelve inches, sixteen inches, twenty inches, or twenty-four inches. A length $L_{RFID}$ of the RFID circuit 130 is measured along the longitudinal axis L between the terminal ends of the antenna 136. In one example, the length $L_{RFID}$ of the RFID circuit 130 can be approximately three inches to approximately twenty inches. The length of the antenna 136 can be greater than or equal to the length $L_{RFID}$ of the RFID circuit. As an example, the length of the antenna 136 can be greater than the length $L_{RFID}$ of the RFID circuit 130 due to the antenna segment 136c which has a length extending at least partially along the transverse axis T. A width of the RFID circuit 130 measured along the transverse axis T can be equal to or less than the width $W_B$ of the body 102.

The RFID circuit 130 can be readable as described herein by a corresponding radiofrequency device, such as an RFID reader/interrogator. The RFID circuit 130 can be an ultra-high frequency (UHF) RFID circuit configured for far-field radiofrequency communication (e.g., in a frequency range of approximately 860 MHz to approximately 960 MHz). As a non-limiting example, the RFID circuit 130 can be configured according to one or more proprietary schemes and/or according to one or more standards, such as ISO 18000-6A, ISO 18000-6B, ISO 18000-6C, ISO/IEC 29143, and/or other standards. The electronic circuit 132 can be electrically connected to the inductive loop 134, which in turn can be electrically coupled to the antenna 136, and the electronic circuit 132 can be operative to respond to a far-field radiofrequency communication via the inductive loop 134 and antenna 136. The RFID circuit 130 can be a passive RFID circuit and the inductive loop 134 can power the electronic circuit 132 via inductive coupling in response to radiofrequency waves, e.g., emitted by the RFID reader/interrogator, which induce an electric current in the antenna 136 and the inductive loop 134. An example RFID circuit 130 is described herein with reference to FIG. 7.

One or more coatings can be applied to the substrate 104 and/or the RFID circuit 130. As a non-limiting example, the one or more coatings can include a silver antimicrobial coating, a varnish, and/or a soft feel coating.

The RFID circuit 130 can be adhered, welded, laminated, printed, or otherwise bonded to the substrate 104. The RFID circuit 130 of the wristband 100 can be disposed on a surface of the substrate 104. In one example, as shown in FIG. 1C, the RFID circuit 130 of the wristband 100 can be disposed between the substrate 104 and another substrate 190 such that the RFID circuit 130 is encompassed or at least partially encompassed by the substrates 104 and 190. In one example, the substrate 190 or at least a portion thereof can provide a printable surface upon which indicia can be printed, e.g., via thermal printing.

Figure 2:
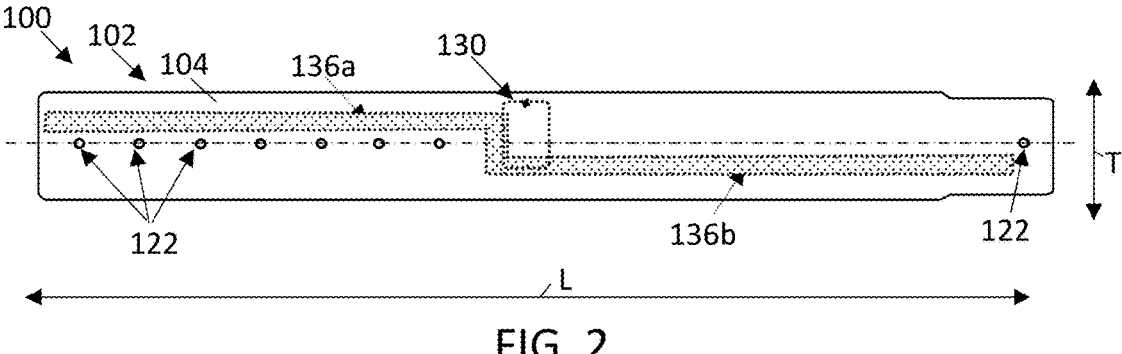
FIG. 2 is a schematic view of an example of a wristband in accordance with embodiments of the present disclosure.

Referring to FIGS. 1A-C, the wristband 100 can include an adhesive 120 disposed at the terminal end 110, which can be used to affix the terminal end 110 to the body 102 to form a loop with the wristband 100 as shown, e.g., in FIGS. 3A-B. The terminal end 110 and the adhesive 120 can form a tamper evident tab. The adhesive 120 can be disposed on a substrate 104 (or the substrate 190). Additionally, or in the alternative, the wristband 100 can include holes 122 along a length of the wristband 100, as shown in FIG. 2. One of the holes 122 at the distal end 110 can be aligned with another one of the holes 122 along the body 102 when the wristband 100 in placed in a loop and a clip can passed through the aligned holes 122 and secured to the wristband to affix the wristband in a loop. Alternatively, the clip can be formed at the distal end 110 and can mate with the holes 122 long the length $L_B$ of the wristband 100. The holes 122 can pass through the substrate 104 (and/or the substrate 190). Any embodiment of the wristbands illustrated herein can include the holes 122 and/or adhesive 120. Where neither the holes 122 nor the adhesive 120 is illustrated, the holes 122 and/or adhesive 120 have been omitted to allow the other elements of the wristbands to be viewed without being obscured. Additionally, while the adhesive 120 has been illustrated in an example position on the wristband, the adhesive 120 can be positioned in other locations in accordance with embodiments of the present disclosure.

The RFID circuit 130 can be disposed about the midline $M_B$ along the longitudinal axis L between the proximal end 106 and the distal end 110 of the body 102 (approximately equal in distance from the proximal end 106 and the distal end 110). The RFID circuit 130 can be centered about the midline $M_B$. While FIGS. 1A-C illustrate an example position of the RFID circuit 130 along the length $L_B$ of the body 102, the RFID circuit 130 can be positioned at any location along the length $L_B$ in accordance with embodiments of the present disclosure.

FIG. 3A-C illustrate an example embodiment of the wristband 100 in a closed state such that the wristband 100 has a loop configuration in accordance with embodiments of the present disclosure. As shown in FIGS. 3A-C, the wristband 100 is wrapped about itself in a (geometric) loop 300 such that one of the terminal ends (e.g., terminal end 110) of the wristband 100 is wrapped about and over the other (e.g., terminal end 106) and affixed to the body 102 (e.g., to the substrate 104 or 190) of the wristband 100. The loop 300 can have a diameter D. The diameter D or the loop 300 can vary based on, for example, a size of the wearer. As an example, the diameter D of the loop 300 can be approximately one and a quarter (1.25) inches to approximately six and a half (6.5) inches. In the loop configuration, the antenna 136 are included the loop 300 and extend circumferentially about a wearer (e.g., a wrist 310 of the wearer). As an example, the antenna 136 included in the loop 300 extends circumferentially about a wearer (e.g., a wrist 310 of the wearer) such that the antenna 136 extends circumferentially approximately 90 degrees to approximately 360 degrees when the diameter D of the loop 300 is approximately one and a quarter (1.25) inches to approximately six and a half (6.5) inches. The RIFD circuit 130 is also included in the loop 300 and extends circumferentially about the loop 300 (e.g., as opposed to flag style wristband where the RFID circuit is not included in the loop). Because the RFID circuit 130 is included in the loop 300, it is more likely that the RFID circuit 130 will be positioned in a manner that interferes with the operation of the RFID circuit 130. For example, when the loop 300 is wrapped about the wrist 310 of a wearer, the wrist 310 can interfere with reception of radiofrequency waves from an RFID reader/interrogator (e.g., RFID reader 810 shown in FIG. 8), particularly, for example, when the wrist 310 or body of the wearer is positioned between the RFID circuit 130 and the RFID reader (e.g., RFID reader 810 shown in FIG. 8), such that the RFID circuit 130, for example, does not generate enough power from the inductive coupling to respond to the RFID reader based on an electric current induced in the antenna and/or inductive loop of the RFID circuit 130. However, because the antenna 136 in the loop 300 extends circumferential about the wrist of the wearer in a circumferentially bypassing, and radially non-overlapping arrangement, an electric current can be induced in the antenna 136, which in turn, can induce an electric current in the inductive loop of the RFID circuit 130 or can increase an electric current induced (where at least some electric current may also be induced in inductive loop by the radiofrequency waves. The positioning of the arrangement of the antenna 136 in a bypassing, non-overlapping arrangement when wrapped about the wrist of the wearer advantageously allows the antenna 136 to improve a response of the RFID circuit 130 without generating electromagnetic interference that would otherwise negate or mitigate the benefits of the antenna 136 extending circumferentially about the loop 300 formed by the wristband 100.

Figure 4A:
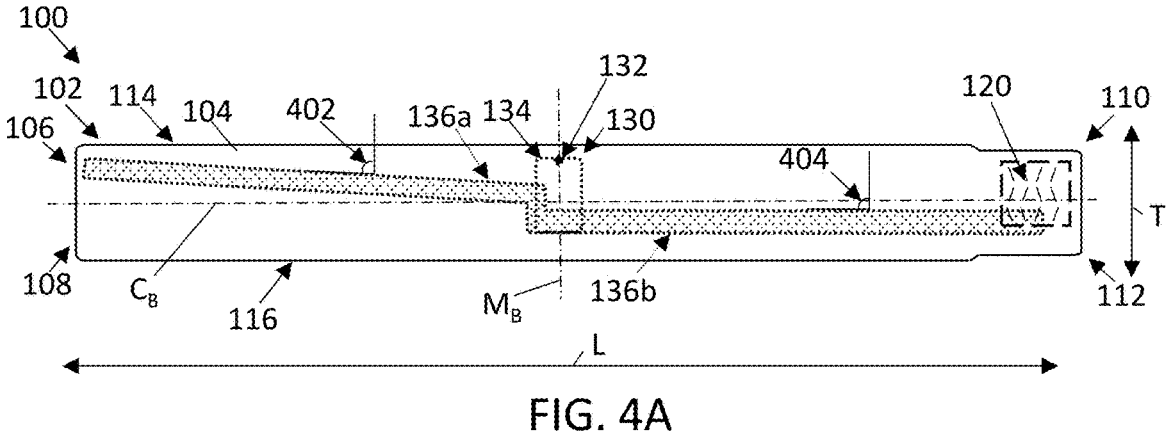
FIG. 4A-B are schematic views of example wristbands in accordance with embodiments of the present disclosure.

FIG. 4A illustrates an embodiment of the wristband 100 described herein with an alternative antenna configuration in accordance with embodiments of the present disclosure. The wristband 100 has been generally described with reference to FIGS. 1A-C. In the present example illustrated in FIG. 4A, the antenna 136 can have a different configuration than the antenna configuration described with reference to FIGS. 1A-C. The antenna 136 can have the antenna segments 136a-c. The antenna segment 136a can extend between the terminal end 106 and a first (proximal) side of the inductive loop 134, the antenna segment 136b can extend between a second (distal) side of the inductive loop 136 and the terminal end 110, and the antenna segment 136c can connect the antenna segments 136a and 136b. In one example, a length of the antenna segment 136b can be equal to or greater than a length of the antenna segment 136a (or vice versa). The antenna segment 136a extends along the longitudinal axis L between thirty (30) and sixty (60) percent of the length $L_B$ of the wristband 100, the antenna segment 136b extends along the longitudinal axis L between thirty (30) and sixty (60) percent of the length $L_B$ of the wristband 100, and/or the antenna 136 extends along the longitudinal axis L between fifty (50) and one hundred (100) percent of the length $L_B$ of the wristband 100. The antenna segments 136a and 136b can be offset from each other relative to the transverse axis T such that when the wristband is configured in the closed position forming a loop (e.g., loop 300 shown in FIGS. 3A-C) the antenna segments 136a and 136b bypass and do not overlap each other. As shown in FIGS. 4A, the antenna segments 136a and 136b can also be offset from each other along the longitudinal axis L such that the antenna segments 136a and 136b do not align along the transverse axis T. In one example, a midline of the RFID circuit 130 (e.g., halfway along the length $L_{RFID}$) of the RFID circuit 130) can be aligned with the midline $M_B$ of the wristband 100. The antenna 136 can be asymmetrically disposed about the midline $M_B$ of the wristband 100 and/or can be asymmetrically disposed about a centerline $C_B$ of the wristband 100. As shown in FIGS. 1A-B, the antenna segments 136a and 136b can extend linearly. The antenna segment 136a can extend at a nonzero angle relative to the longitudinal axis L and/or the transverse axis T and the antenna segment 136b can extend parallel to the longitudinal axis L such that the antenna segments 136a and 136b are not parallel to each other (e.g., the antenna segment extends at an oblique angle relative to the antenna segment 136b). When the wristband 100 is the closed configuration to form a loop (e.g., loop 300 shown in FIGS. 3A-C), the antenna segments 136a and 136b can form helices, where the antenna segment 136a can have an oblique nonzero helix angle 402 of less than ninety degrees relative to the transverse axis T (which extends axially when the loop 300 is formed) and the antenna segment 136b can have a helix angle 404 of ninety degrees relative to the transverse axis T. In one example, the antenna segment 136a can have a helix angle 402 of between sixty (60) and eighty-nine (89) degrees or between ninety-one (91) and one hundred twenty (120) relative to the transverse axis T. The antenna segment 136c can extend at angle relative to the antenna segments 136a and 136b and to the longitudinal axis L. In one example, the antenna segment 136c can extend parallel to the transverse axis T such that the antenna segment has a helix angle of zero when the wristband 100 is the closed configuration to form a loop (e.g., loop 300 shown in FIGS. 3A-C). In one example, the antenna segment 136c can extend at a nonzero angle relative to the longitudinal axis L and the transverse axis T (e.g., the antenna segment 136c can extend at an oblique angle relative to the longitudinal axis L and/or the transverse axis T). In one example the antenna segments 136a can extend along the longitudinal axis L on a first side of the centerline $C_B$ and antenna segment 136b can extend along the longitudinal axis L on a second side of the centerline $C_B$. In one example, the antenna segment 136a entirely disposed on the first side of the centerline $C_B$ and the antenna segment is disposed entirely on the second side of the centerline $C_B$. In one example, at least a portion of the antenna segments 136a and/or 136b can extend across the centerline $C_B$.

Figure 4B:
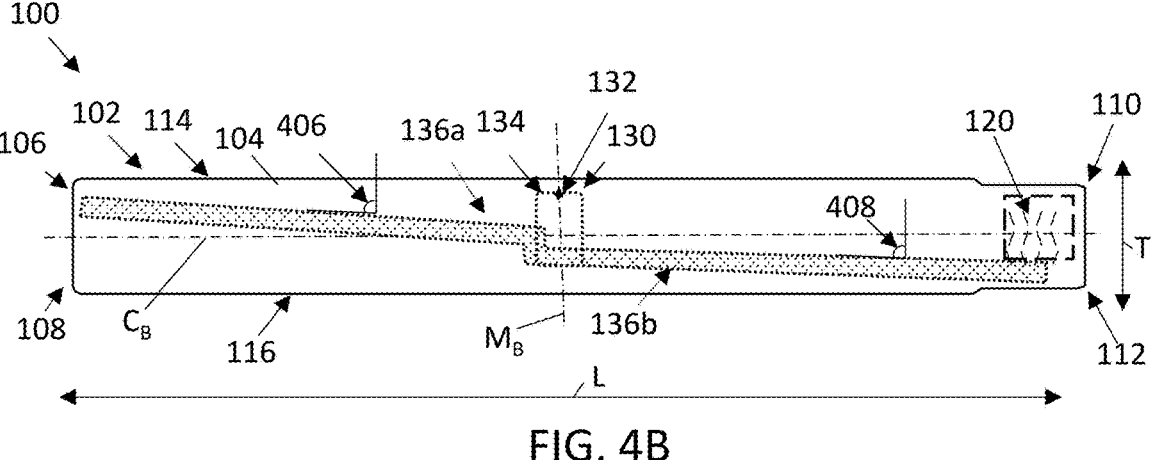

FIG. 4B illustrates an embodiment of the wristband 100 described herein with an alternative antenna configuration in accordance with embodiments of the present disclosure. The wristband 100 has been generally described with reference to FIGS. 1A-C. In the present example illustrated in FIG. 4B, the antenna 136 can have a different configuration than the antenna configuration described with reference to FIGS. 1A-C. The antenna 136 can have the antenna segments 136a-c. The antenna segment 136a can extend between the terminal end 106 and a first (proximal) side of the inductive loop 134, the antenna segment 136b can extend between a second (distal) side of the inductive loop 136 and terminal end 110, and the antenna segment 136c can connect the antenna segments 136a and 136b. In one example, a length of the antenna segment 136b can be equal to or greater than a length of the antenna segment 136a (or vice versa). The antenna segment 136a extends along the longitudinal axis L between thirty (30) and sixty (60) percent of the length $L_B$ of the wristband 100, the antenna segment 136b extends along the longitudinal axis L between thirty (30) and sixty (60) percent of the length $L_B$ of the wristband 100, and/or the antenna 136 extends along the longitudinal axis L between fifty (50) and one hundred (100) percent of the length $L_B$ of the wristband 100. The antenna segments 136a and 136b can be offset from each other relative to the transverse axis T such that when the wristband is configured in the closed position forming a loop (e.g., loop 300 shown in FIGS. 3A-C) the antenna segments 136a and 136b bypass and do not overlap each other. As shown in FIGS. 4B, the antenna segments 136a and 136b can also be offset from each other along the longitudinal axis L such that the antenna segments 136a and 136b do not align along the transverse axis T. In one example, a midline of the RFID circuit 130 (e.g., halfway along the length $L_{RFID}$) of the RFID circuit 130) can be aligned with the midline $M_B$ of the wristband 100. The antenna 136 can be asymmetrically disposed about the midline $M_B$ of the wristband 100 and/or can be asymmetrically disposed about a centerline $C_B$ of the wristband 100. As shown in FIGS. 1A-B, the antenna segments 136a and 136b can extend linearly. The antenna segments 136a and 136b can extend at nonzero angles relative to the longitudinal axis L and/or the transverse axis T. In one example, the angles at which the antenna segments 136a and 136b extend are equal and the antenna segments 136a and 136b are parallel to each other. In one example, the angles at which the antenna segments 136a and 136b extend are different and the antenna segments 136a and 136b are not parallel to each other. When the wristband 100 is the closed configuration to form a loop (e.g., loop 300 shown in FIGS. 3A-C), the antenna segments 136a and 136b can form helices, where the antenna segments 136a and 136b can have oblique nonzero helix angles 406 and 408, respectively, of less than ninety degrees relative to the transverse axis T (which extends axially when the loop 300 is formed). The antenna segment 136c can extend at angle relative to the antenna segments 136a and 136b and to the longitudinal axis L. In one example, the antenna segments 136a and 136b can have a helix angle 404 and 406, respectively of between sixty (60) and eighty-nine (89) degrees or between ninety-one (91) and one hundred twenty (120) relative to the transverse axis T. In one example, the antenna segment 136c can extend parallel to the transverse axis T such that the antenna segment has a helix angle of zero when the wristband 100 is the closed configuration to form a loop (e.g., loop 300 shown in FIGS. 3A-C). In one example, the antenna segment 136c can extend at a nonzero angle relative to the longitudinal axis L and the transverse axis T (e.g., the antenna segment 136c can extend at an oblique angle relative to the longitudinal axis L and/or the transverse axis T). In one example the antenna segments 136a can extend along the longitudinal axis L on a first side of the centerline $C_B$ and antenna segment 136b can extend along the longitudinal axis L on a second side of the centerline $C_B$. In one example, the antenna segment 136a entirely disposed on the first side of the centerline $C_B$ and the antenna segment is disposed entirely on the second side of the centerline $C_B$. In one example, at least a portion of the antenna segments 136a and/or 136b can extend across the centerline $C_B$.

Figure 5A:
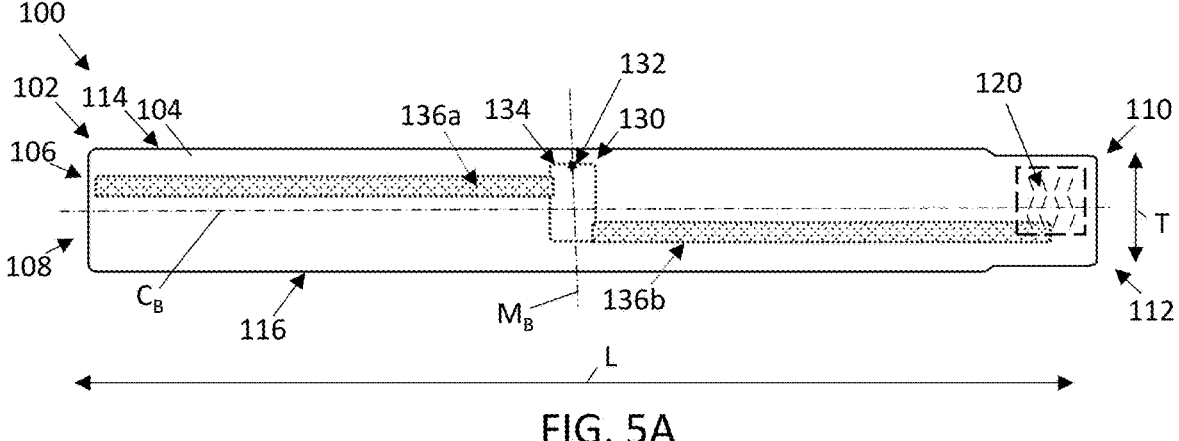
FIG. 5A is a schematic view of another example of a wristband in accordance with embodiments of the present disclosure.
Figure 5B:
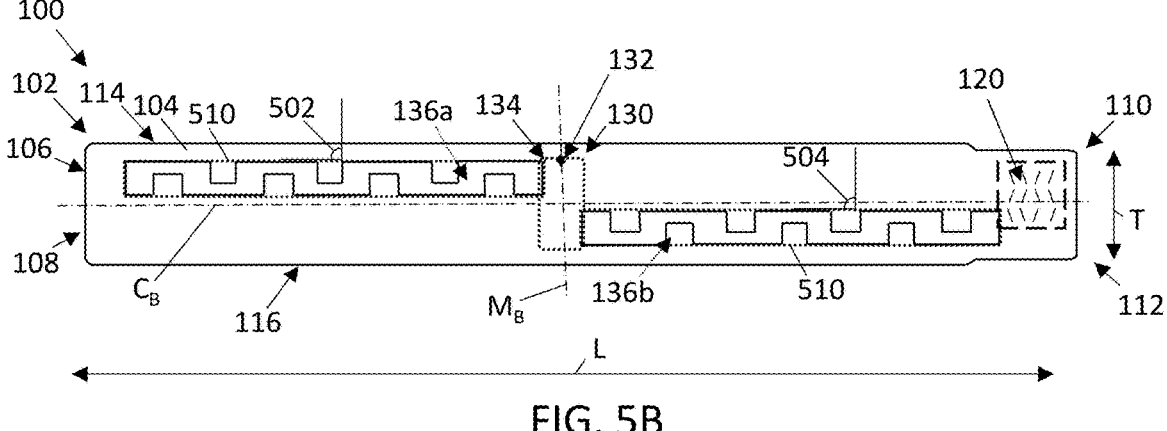
FIG. 5B is a schematic view of another example of a wristband in accordance with embodiments of the present disclosure.
Figure 6:
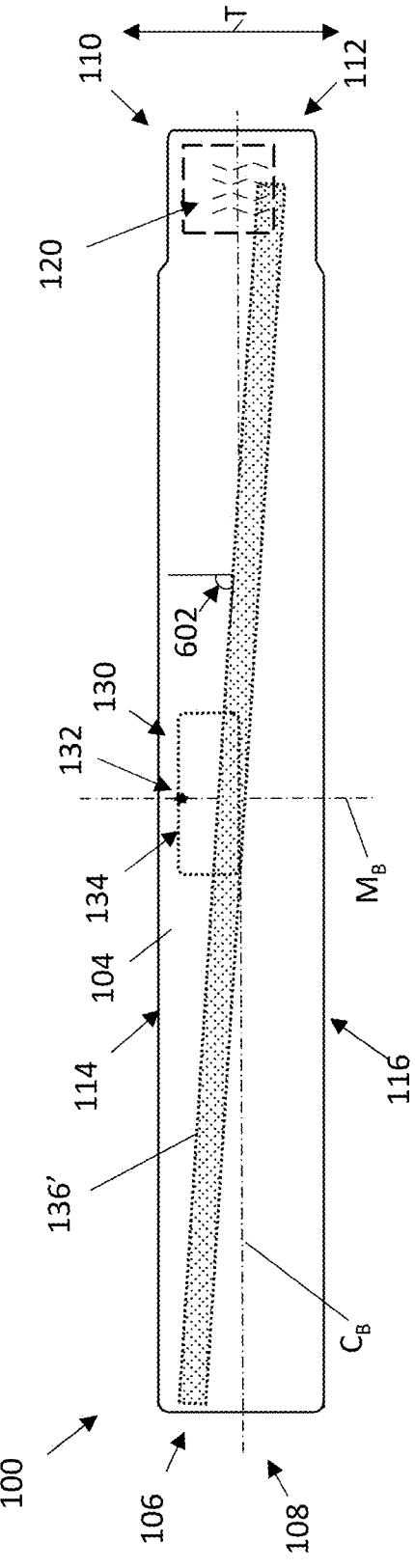
FIG. 6 is a schematic view of another example of a wristband in accordance with embodiments of the present disclosure.

FIGS. 5A-B illustrates an embodiment of the wristband 100 with another alternative antenna configuration in accordance with embodiments of the present disclosure. The wristband 100 has been generally described with reference to FIGS. 1A-C. In the present examples illustrated in FIGS. 5A-B, the antenna 136 can have a different configuration than the antenna configuration described with reference to FIGS. 1A-C. The antenna 136 can have the antenna segments 136a-b and can be devoid of the antenna segment 136c. The antenna segment 136a can extend between the terminal end 106 and a first (proximal) side of the inductive loop 134 and can be coupled to the first (proximal) side of the inductive loop 134. The antenna segment 136b can extend between a second (distal) side of the inductive loop 134 and the terminal end 110 and can be coupled to the second (distal) side of the inductive loop 134. In one example, a length of the antenna segment 136b can be equal to or greater than a length of the antenna segment 136a (or vice versa). The antenna segment 136a extends along the longitudinal axis L between thirty (30) and sixty (60) percent of the length $L_B$ of the wristband 100, the antenna segment 136b extends along the longitudinal axis L between thirty (30) and sixty (60) percent of the length $L_B$ of the wristband 100, and/or the antenna 136 extends along the longitudinal axis L between fifty (50) and one hundred (100) percent of the length $L_B$ of the wristband 100. The antenna segments 136a and 136b can be offset from each other relative to the transverse axis T such that when the wristband 100 is configured in the closed position forming a loop (e.g., loop 300 shown in FIGS. 3A-C) the antenna segments 136a and 136b bypass and do not overlap each other. As shown in FIGS. 5A, the antenna segments 136a and 136b can also be offset from each other along the longitudinal axis L such that the antenna segments 136a and 136b do not align along the transverse axis T. In one example, a midline of the RFID circuit 130 (e.g., halfway along the length LRFID of the RFID circuit 130) can be aligned with the midline MB of the wristband 100. The antenna 136 can be asymmetrically disposed about the midline MB of the wristband 100 and/or can be asymmetrically disposed about a centerline CB of the wristband 100. As shown in FIGS. 5A-B, the antenna segments 136a and 136b can extend linearly. For example, in FIG. 5A, the antenna segments 136a and 136b can be linear rectangular segments, and in FIG. 5B, the antenna segments 136a and 136b can have a serpentine pattern that is bounded by a linear rectangle 510 and 520, respectively. The antenna segments 136a and 136b can extend parallel or at a nonzero angle relative to the longitudinal axis L and/or can extend perpendicular or at a nonzero angle relative to the transverse axis T. In one example, the angles at which the antenna segments 136a and 136b extend are equal and the antenna segments 136a and 136b are parallel to each other. In one example, the angles at which the antenna segments 136a and 136b extend are different and the antenna segments 136a and 136b are not parallel to each other. When the wristband 100 is the closed configuration to form a loop (e.g., loop 300 shown in FIGS. 3A-C), the antenna segments 136a and 136b can form bypassing, non-overlapping helices, where the antenna segments 136a and 136b can have helix angles 502 and 504, respectively, of ninety (90) degrees or can have oblique nonzero helix angles 502 and 504 of less than ninety degrees relative to the transverse axis T (which extends axially when the loop 300 is formed). In one example, the antenna segments 136a and 136b can have a helix angle 502 and 504, respectively, of between sixty (60) and eighty-nine (89) degrees or between ninety-one (91) and one hundred twenty (120) relative to the transverse axis T. In one example the antenna segments 136a can extend along the longitudinal axis L on a first side of the centerline CB and antenna segment 136b can extend along the longitudinal axis L on a second side of the centerline CB.

In one example, the antenna segment 136a entirely disposed on the first side of the centerline CB and the antenna segment is disposed entirely on the second side of the centerline CB. In one example, at least a portion of the antenna segments 136a and/or 136b can extend across the centerline CB.

FIG. 6 illustrates an embodiment of the wristband 100 with another alternative antenna configuration in accordance with embodiments of the present disclosure. The wristband 100 has been generally described with reference to FIGS. 1A-C. In the present example illustrated in FIG. 6, the antenna 136' can have a different configuration than the antenna configuration described with reference to FIGS. 1A-C. Instead of having multiple identifiable segments, the antenna 136' can extend linearly between the terminal ends of the antenna 136'. In one example, the antenna 136 extends along the longitudinal axis L between fifty (50) and one hundred (100) percent of the length $L_B$ of the wristband 100. In one example, a midline of the RFID circuit 130 (e.g., halfway along the length LRFID of the RFID circuit 130) can be aligned with the midline MB of the wristband 100. The antenna 136' can be asymmetrically disposed about the midline MB of the wristband 100 and/or can be asymmetrically disposed about a centerline CB of the wristband 100. The antenna 136' can extend at a nonzero angle relative to the longitudinal axis L and/or can extend a nonzero angle relative to the transverse axis T. When the wristband 100 is the closed configuration to form a loop (e.g., loop 300 shown in FIGS. 3A-C), the antenna 136' can form a helix having an oblique nonzero helix angle 602 relative to the transverse axis T (which extends axially when the loop 300 is formed). The helix formed by the antenna 136' can have a bypassing and non-overlapping arrangement (e.g., antenna bypasses itself circumferentially around the loop and does not overlap itself in a radial direction). In one example, the antenna 136' can have a helix angle 602 of between sixty (60) and eighty-nine (89) degrees or between ninety-one (91) and one hundred twenty (120) relative to the transverse axis T. In one example the antenna can extend the centerline CB.

Figure 7:
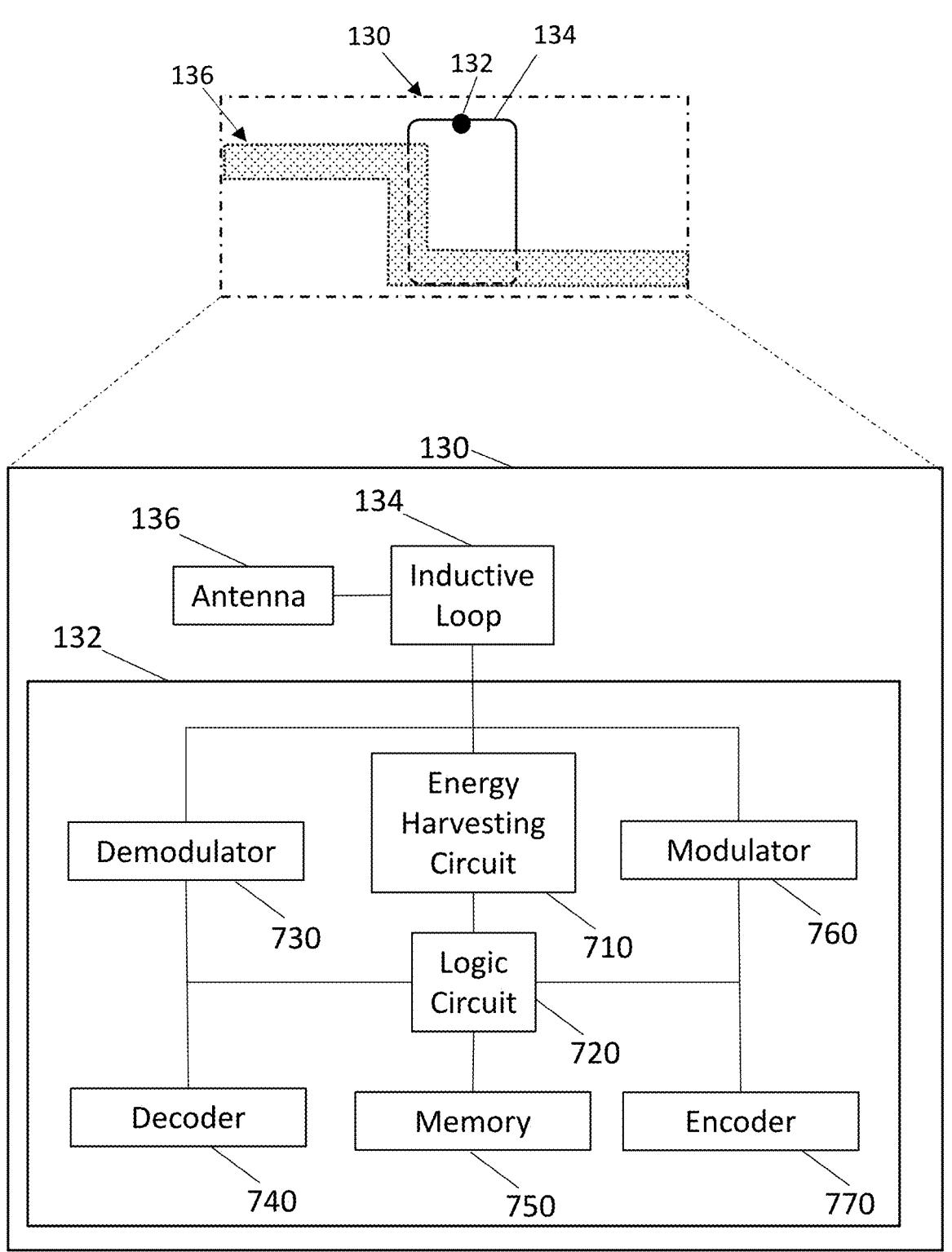
FIG. 7 is a block diagram of an example embodiment of the RFID circuit in accordance with embodiments of the present disclosure.

FIG. 7 is a block diagram of an example embodiment of the RFID circuit 130 in accordance with embodiments of the present disclosure. As shown in FIG. 7, the electronic circuit 132 of the RFID circuit 130 can include an energy harvesting circuit 710, a logic circuit 720, a demodulator 730, a decoder 740, memory 750, a modulator 760, and an encoder 770. As a non-limiting example, the electronic circuit 132 can be implemented as one or more integrated and/or discrete circuits.

The memory 750 is a non-transitory computer-readable medium that can include volatile (e.g., RAM) and/or non-volatile memory (e.g., EEPROM). The memory 750 can store data, including an identifier, which can be used in a system to identify and distinguish the RFID circuit 130 from other RFID circuits in a system and can also be used to associate the RFID circuit 130 with an object in the system. In an example embodiment, the identifier can be a string of alphanumeric characters. The RFID circuit 130 can be associated with the wristband 100 and/or can be associated with a person, animal, or object about which the wristband 100 is wrapped. For example, when RFID circuit 130 of the wristband 100 is interrogated by an RFID reader, the RFID circuit 130 may respond with the stored identifier to identify itself and the RFID reader and/or other devices can use the association between the identifier, the wristband 100, and/or the wearer of the wristband 100 to determine and/or retrieve information about the wearer, and/or the RFID reader and/or other devices can perform one or more operations based on the receipt of the identifier and/or the information determined and/or retrieved about the wearer of the wristband 100 based on the identifier.

When the RFID circuit 130 is within a read range of the RFID reader/interrogator, radio waves of the far-field radiofrequency communication emitted by the RFID reader can generate a time varying electromagnetic field, which in turn can induce, via inductive coupling, an electrical signal (e.g., an electric current) in the antenna 136 and the inductive loop 134. As described herein, the antenna 136 can increase the read range of the RFID circuit 130, can increase a read angle of the RFID circuit 130, and/or can allow the RFID circuit 130 to be read by the RFID reader independent of the orientation of the RFID circuit in the wristband relative to a body part of the wearer and position of the RFID reader, e.g., by inducing more power in the RFID circuit 130, particularly when there is radiofrequency interference from a body part of the wearer. The electrical signal can be processed by the energy harvesting circuit 710 to generate a power supply voltage to power the components of the electronic circuit 132. For example, the energy harvesting circuit 710 receives the electrical signal from the inductive loop 134 and converts the electrical signal to a direct current voltage. The energy harvesting circuit 710 can include, for example, a charge pump, voltage converter, voltage regulator, and/or other circuitry. The electrical signal can also include information that can be demodulated by the demodulator 730 and decoded by the decoder 740. The decoded electrical signal can be received as an input by the logic circuit 720 from the decoder 740.

In response to receipt of the decoded electrical signal and when sufficient power is generated from the induced electrical current, the logic circuit 720 can retrieve data from the memory 750 (e.g., the identifier) and output the data to the encoder 770. The logic circuit 720 can include software, firmware, and/or hardware, or any combination thereof to facilitate the operations performed by the logic circuit 720. For example, the logic circuit 720 can include digital circuitry, such as logic gates. The encoder 770 can encode the data from the logic circuit 720 and output the encoded data to the modulator 760, which can modulate the encoded data and output the modulated data to the inductive loop 134, which can, in combination with the antenna 136 modulate the modulated signal onto the far-field radiofrequency communication received by the RFID circuit 130 from the RFID reader.

While an example embodiment of the RFID circuit 130 has been illustrated in FIG. 7, embodiments of the RFID circuit 130 can include more, fewer, and/or different components. As an example, the RFID circuit 130 can include any number of energy harvesting circuits, demodulators, decoders, logic circuits, encoders, and/or modulators.

Figure 8:
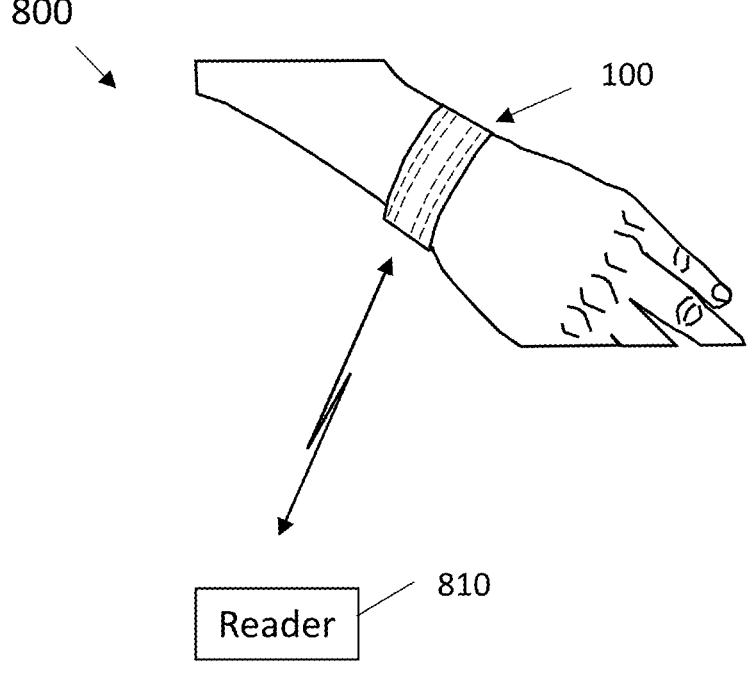
FIG. 8 illustrates an example of a system including an RFID reader and a wristband in accordance with embodiments of the present disclosure.

FIG. 8 is an example environment 800 in accordance with embodiments of the present disclosure. The environment 800 can include far-field RFID reader 810 and an embodiment of the wristband 100 wrapped in a loop about a wrist of the wearer. The RFID reader 810 can be disposed at a fixed or stationary location and/or can be moved to different locations. For example, the RFID reader 810 can be spaced away from the RFID circuit 130 to facilitate far-field radiofrequency communication (e.g., RFID reader 810 can be greater than twelve inches, two feet, three feet, four feet, five feet, six feet, seven feet, eight feet, or more from the RFID circuit 130). The RFID reader 810 can attempt to interrogate the RFID circuit 130 by emitting a far-field radiofrequency communication. As described herein, when the wristband 100 is wrapped in a loop about the wrist of a wearer and the RFID circuit 130 is included in the loop, the wrist 310 can cause radiofrequency interfere with reception of radiofrequency waves from an RFID reader/interrogator, particularly when the wrist 310 is positioned between the RFID circuit 130 and the RFID reader 810. The radiofrequency interference can reduce the read range of the RFID circuit 130 such that the RFID circuit 130 needs to be closer to the RFID reader 810 than it normally would need to be without the radiofrequency interference, the power of the radiofrequency waves emitted by the RFID reader 810 would need to be increase to compensate for the interference, or the orientation of the reader or the RFID circuit would need to be adjusted. However, by arranging the antenna 136 in the loop 300 formed by the wristband 100 to extend circumferentially about the loop in a bypassing, non-overlapping configuration, an electric current can be induced in the antenna 136, which in turn, can induce an electric current in the inductive loop of the RFID circuit 130 or can increase an electric current induced (where at least some electric current may also be induced in the inductive loop by the radiofrequency waves).

Figure 11:
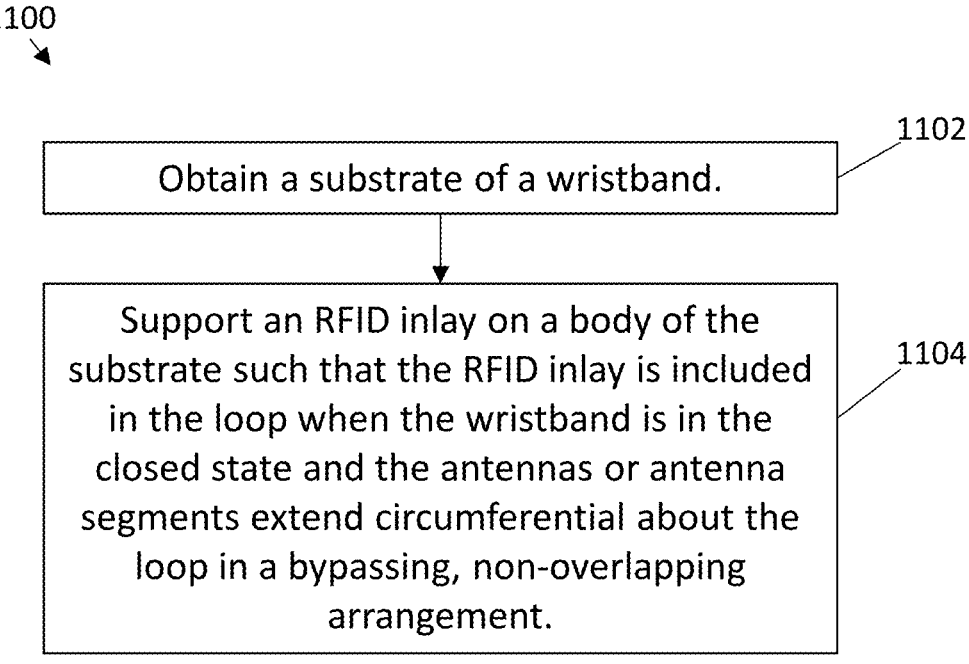
FIG. 11 is a flowchart illustrating an example process in accordance with embodiments of the present disclosure.

FIG. 11 is a flowchart illustrating an example process 1100 of forming an example wristband (e.g., wristband 100) in accordance with embodiments of the present disclosure. At operation 1102, a substrate of a wristband is obtained. At operation 1104, an RFID circuit (e.g., RFID circuit 130) is supported on an elongated flexible and/or non-rigid body (e.g., body 102) of the substrate. The wristband has an open state in which the wristband is capable of being positioned in a planar configuration and has a closed state in which the wristband is wrapped in a loop (e.g., loop 300) such that a first end (e.g., terminal end 110) of the wristband overlaps a second end (e.g., terminal end 106) of the wristband and is fixed to the body. The RFID circuit is supported by the body by positioning the RFID circuit on the body such that the RFID circuit is configured to be included in the loop 300 when the wristband is in the closed state.

Figure 12:
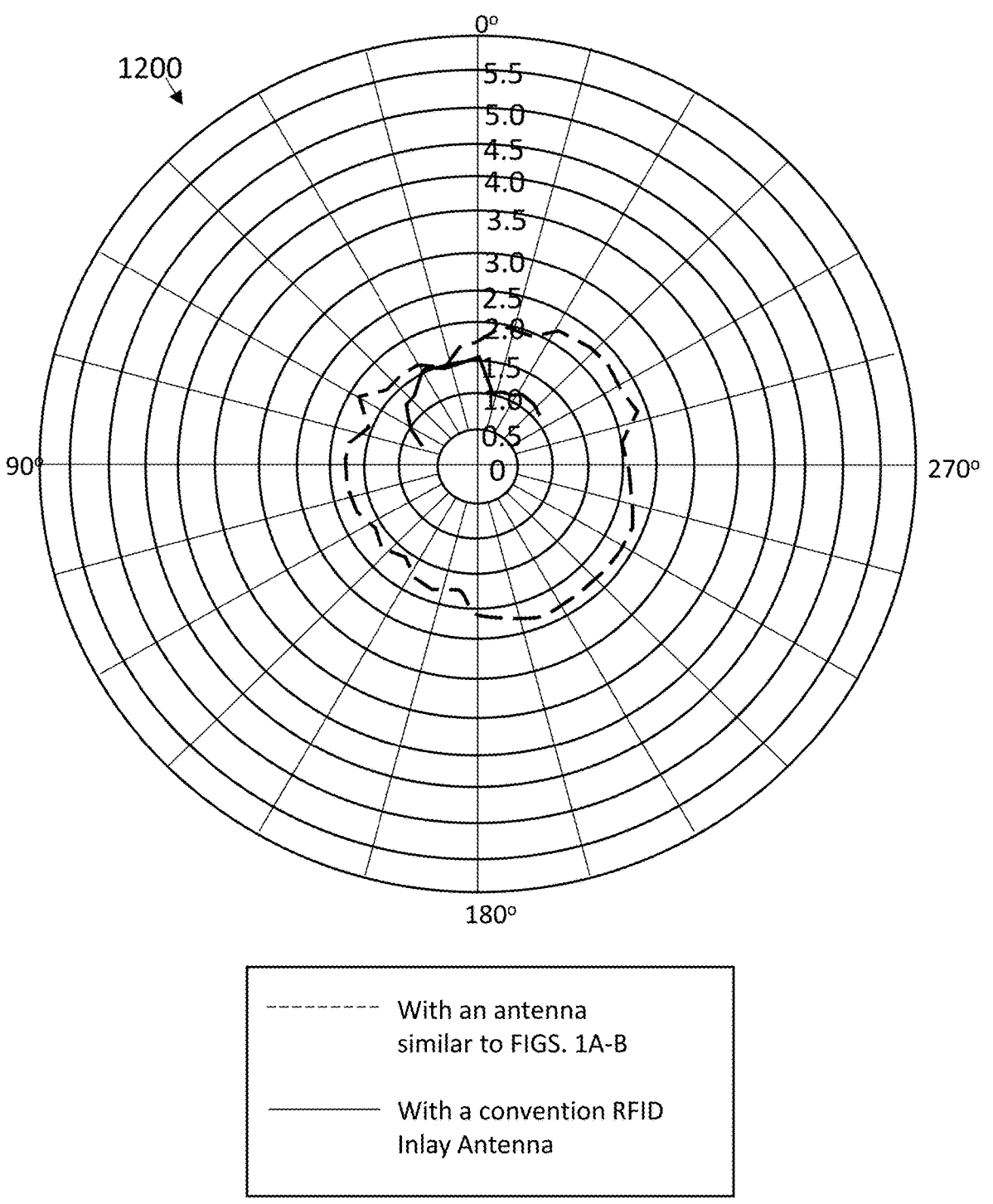
FIG. 12 is a graph illustrating a read response of an RFID circuit in an example wristband in accordance with embodiments of the present disclosure.

FIG. 12 illustrate experimental results of a read response and orientation sensitivity of RFID circuits in example embodiment of wristband (e.g., shown in FIGS. 1A-B) compared to a wristband with a conventional RFID inlay. The experimental setup is shown in FIG. 8, where the reader 810 is rotated circumferentially about the wristband or by rotating the wristband about circumferentially about the reader 810 by three hundred sixty 360 degrees. The experimental setup included the wristband being wrapped in a loop about a phantom arm that imitates an arm of a human for radiofrequency experiments. The phantom arm utilized for the experiments was the SHO Generic Forearm Phantom CTIA Version 1 from Speag and a response of the RFID circuit in the wristbands were measured by the Tagformance Pro system from Voyantic. The wristbands were 11 inches in length and had a circumference 7 inches (a diameter of about 2.2 inches) when the wristbands were wrapped around the Phantom arm (simulated wrist). The example embodiment of the wristband included the antenna 136 (including antenna portions 136*a-c*) extending about 9 inches such that the terminal ends of the antenna 136 are about 1 inch away from the terminal ends of the wristband. When the terminal ends of the wristband overlap to form the loop about the phantom arm, 2 inches of the terminal ends antenna bypassed each other in a non-overlapping manner. For the wristband with the convention RFID inlay, the conventional inlay extends 1.5 inches along the length of the wristband, where the RFID inlay included a serpentine antenna pattern.

A graph 1200 measures a read range radially from a center axis (which corresponds to a range of 0 meters) by the concentric circles and measures a read angle from zero (0) degrees to three hundred sixty degrees (360) degrees circumferentially in a counterclockwise direction. The solid line illustrates a read range of the wristband with the conventional RFID inlay and the dashed line illustrates the embodiment of the wristband illustrated in FIGS. 1A-B. As shown in FIG. 12, the read range of an embodiment of the wristband corresponding to FIGS. 1A-B produced a greater read range over a greater read angle than the wristband with the conventional RFID inlay configuration.

A further experiment was performed comparing an embodiments wristband illustrated in FIGS. 1A-B (and implemented as described with reference to FIG. 12) to a wristband that includes a dipole antenna that was coextensive with the width and length of the wristband (a "full dipole wristband"). Each wristband was 11 inches in length and were wrapped around the wrist to have a circumference of 7 inches, such that when the terminal ends of the embodiment of the wristband corresponding to FIGS. 1A-B overlap to form the loop about the wrist, 2 inches of the terminal ends antenna bypassed each other in a non-overlapping manner, and such that when the terminal ends of the full dipole wristband overlap to form the loop about the wrist, 2 inches of the terminal ends antenna overlap each other (e.g., one end of the antenna is directly over the other end of the antenna. As shown in the Table 1 below, the embodiment of the wristband corresponding to FIGS. 1A-B was read consistently when the wristbands were rotated about the wearer's wrist. The RFID readings at 0° correspond to the integrated circuit of the RFID circuit being aligned with the RFID reader without obstruction from the wearer's wrist, the RFID readings at 180° correspond to the integrated circuit of the RFID circuit being rotated about the users wrist 180° such that the wearer's wrist is positioned between the RFID reader and the integrated circuit of the RFID circuit, and the RFID readings at 90° and 270° correspond to the integrated circuit of the RFID circuit being offset 90° and 270° on the wearer's wrist relative to the 0° orientation.

TABLE 1

| Number of successful reads by the RFID reader in 20 seconds using a continuous read mode | | |
| --- | --- | --- |
| Read Angle | Full Dipole Wristband | Wristband corresponding to FIGS. 1A-B |
| 0° | 11 | 16 |
| 180° | 0 | 21 |
| 90° | 4 | 16 |
| 270° | 0 | 14 |

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A device, comprising:

a wristband having a flexible elongated body, the wristband having an open state in which the wristband is capable of being positioned in a planar configuration and having a closed state in which the wristband is wrapped in a loop such that a first end of the wristband overlaps a second end of the wristband and is fixed to the flexible elongated body; and a radiofrequency identification (RFID) circuit supported by the flexible elongated body of the wristband, the RFID circuit being positioned on the flexible elongated body such that the RFID circuit is configured to be included in the loop when the wristband is in the closed state, the RFID circuit including a dipole antenna configured to be included in the loop when the wristband is in the closed state, the dipole antenna includes a first segment, a second segment, and a third segment, the first segment extends from the third segment towards the first end of the wristband to a first terminal end of the dipole antenna and the second segment extends from the third segment towards the second end of the wristband to a second terminal end of the dipole antenna such that the first segment and second segment extend circumferentially in a bypassing, radially non-overlapping arrangement about the loop when the wristband is in the closed state.

2. The device of claim 1, wherein the first segment and the second segment extend parallel to each other.

3. The device of claim 2, wherein the flexible elongated body has a length measured along a longitudinal axis and a width measure along a transverse axis that is perpendicular to the longitudinal axis, and the first segment and the second segment are offset relative to each other along at least one of the longitudinal axis or the transverse axis.

4. The device of claim 2, wherein the first and second segments extend parallel to a longitudinal axis.

5. The device of claim 2, wherein at least one of the first segment or the second segment has a helix angle of ninety degrees.

6. The device of claim 2, wherein at least one of the first segment or the second segment has a nonzero helix angle that is less than ninety degrees.

7. The device of claim 2, wherein the first segment bypasses the second segment without radially overlapping the second segment when the wristband is in the closed state.

8. The device of claim 2, wherein at least one of the first segment or the second segment extends along a longitudinal axis between thirty and sixty percent of the length of the wristband.

9. The device of claim 1, wherein a length of the second segment is equal to or greater than a length of the first segment.

10. The device of claim 1, wherein the first segment is disposed entirely on a first side of a centerline of the wristband and the second segment is disposed entirely on the second side of the centerline.

11. The device of claim 10, wherein at least one of the first segment or the second segment has a serpentine pattern.

12. The device of claim 1, wherein the flexible elongated body has a length measured along a longitudinal axis and a width measure along a transverse axis that is perpendicular to the longitudinal axis, and the dipole antenna extends along the longitudinal axis between fifty percent and one hundred percent of the length of the wristband.

13. The device of claim 1, wherein the flexible elongated body has a length measured along a longitudinal axis and a width measure along a transverse axis that is perpendicular to the longitudinal axis, and the dipole antenna extends along the longitudinal axis between seventy percent and one hundred percent of the length of the wristband.

14. The device of claim 1, wherein the flexible elongated body has a length measured along a longitudinal axis and a width measure along a transverse axis that is perpendicular to the longitudinal axis, and the dipole antenna extends linearly between the proximal and distal end of the wristband and has a nonzero helix angle that is less than relative to the transverse axis.

15. The device of claim 1, wherein the dipole antenna extends circumferentially about the loop by approximately one hundred eighty (180) degrees to approximately three hundred sixty (360) degrees.

16. A device, comprising:

a wristband having a flexible elongated body, the wristband having an open state in which the wristband is capable of being positioned in a planar configuration and having a closed state in which the wristband is wrapped in a loop such that a first end of the wristband overlaps a second end of the wristband and is fixed to the flexible elongated body; and a radiofrequency identification (RFID) circuit supported by the flexible elongated body of the wristband, the RFID circuit being positioned on the flexible elongated body such that the RFID circuit is configured to be included in the loop when the wristband is in the closed state, the RFID circuit including an antenna configured to be included in the loop when the wristband is in the closed state, the antenna extends circumferentially in a bypassing, radially non-overlapping arrangement about the loop when the wristband is in the closed state, wherein the RFID circuit includes an electronic circuit, an inductive loop operatively coupled to the electronic circuit, and the antenna operatively coupled to the inductive loop, wherein a portion of the antenna that overlays the inductive loop and coincides with a perimeter of the inductive loop.

17. The device of claim 16, wherein the antenna includes a first segment extending between a proximal end of the wristband and the inductive loop and includes a second segment extending between a distal end of the wristband and the inductive loop.

18. The device of claim 17, wherein the antenna includes a third segment extending between the first and second segments.

19. The device of claim 17, wherein the inductive loop electrically couples the first segment to the second segment.

* * * * *